United States Patent [19]

Hosoi

[11] Patent Number: 5,335,141
[45] Date of Patent: Aug. 2, 1994

[54] PORTABLE ELECTRONIC APPARATUS HAVING A REMOVABLE KEYBOARD SECURED TO A HOUSING BY SCREWS PROTRUDING THROUGH THE BOTTOM WALL OF THE HOUSING

[75] Inventor: Takashi Hosoi, Tokyo, Japan

[73] Assignee: Kabushiki Kaisha Toshiba, Kawasaki, Japan

[21] Appl. No.: 115,782

[22] Filed: Sep. 3, 1993

Related U.S. Application Data

[63] Continuation of Ser. No. 905,485, Jun. 26, 1992, abandoned, which is a continuation of Ser. No. 542,042, Jun. 22, 1990, abandoned.

[30] Foreign Application Priority Data

Jun. 23, 1989 [JP] Japan .................. 1-162217

[51] Int. Cl.$^5$ .............. H05K 7/02; H05K 9/00; B41J 29/02; G06F 1/16
[52] U.S. Cl. .................. 361/680; 361/818; 174/35 R; 400/692
[58] Field of Search ........... 364/708.1, 709.01, 709.12; 341/22, 34; 400/472, 479, 479.2, 691, 692, 693; 248/27.3; 200/5 A; 312/223.2; 174/35 R; 361/679, 680, 683, 816, 818

[56] References Cited

U.S. PATENT DOCUMENTS

| | | | |
|---|---|---|---|
| 4,035,794 | 7/1977 | Norton et al. | 361/400 X |
| 4,323,979 | 4/1982 | Johnston | 364/708 |
| 4,333,155 | 6/1982 | Johnston | 364/708 |
| 4,467,150 | 8/1984 | Leitermann et al. | 200/5 A |
| 4,528,428 | 7/1985 | Gotoh et al. | 200/5 A |
| 4,571,456 | 2/1986 | Paulsen et al. | |
| 4,671,688 | 6/1987 | Brashears | |
| 4,716,262 | 12/1987 | Morse | 200/5 A |
| 4,717,990 | 1/1988 | Tugcu | 361/424 |
| 4,742,478 | 5/1988 | Nigro, Jr. et al. | 361/394 X |
| 4,791,258 | 12/1988 | Youtz et al. | 200/5 A |
| 4,818,828 | 4/1989 | Corley et al. | 200/5 A |
| 4,851,618 | 7/1989 | Amino et al. | 200/5 A |
| 4,873,394 | 10/1989 | Bhargava et al. | 361/424 X |
| 4,874,493 | 1/1990 | Smith et al. | 200/5 A |
| 4,992,631 | 2/1991 | Gee | 200/5 A |
| 5,153,589 | 10/1992 | Heys, Jr. et al. | 341/22 |

FOREIGN PATENT DOCUMENTS

0178800 4/1986 European Pat. Off. .

OTHER PUBLICATIONS

"Keyboard Equipped with Two Key Layouts", IBM Technical Disclosure, vol. 30, No. 7, Dec., 1987, pp. 428–429.
Toshiba, T1600 Portable Personal Computer, User's Manual, Sep., 1988.
Toshiba, T3100e Portable Personal Computer, Reference Manual, Sep., 1988.
Toshiba T32005X Portable Personal Computer, Reference Manual, Jul. 1989.
Toshiba T3200 Portable Personal Computer, Reference Manual, copyright 1987.
Toshiba, T3100SX Portable Personal Computer, Reference Manual, Sep. 1989.
Toshiba, T5200 Portable Personal Computer, Reference Manual Sep., 1988.
Toshiba, T2000 SX Portable Personal Computer, Reference Manual, Nov. 1990.

*Primary Examiner*—Leo P. Picard
*Assistant Examiner*—Michael W. Phillips
*Attorney, Agent, or Firm*—Cushman, Darby & Cushman

[57] ABSTRACT

A portable personal computer includes a housing 1 having a mounting portion. A keyboard unit is removably mounted on the mounting portion. The keyboard unit includes a planer keyboard body made of synthetic resin, a large number of keys arranged substantially over the whole top face of the keyboard body, a film member put on the underside of the keyboard body, and a shielding plate fixed to the underside of the film member. A keyboard frame is fitted on the peripheral edge portion of the keyboard body and fitted to the mounting portion of the housing. The keyboard body has fixing portions protruding from the underside thereof to extend through the film member and the shielding plate. The fixing portions are fixed to the bottom wall of the housing by screws.

17 Claims, 7 Drawing Sheets

PORTABLE ELECTRONIC APPARATUS HAVING A REMOVABLE KEYBOARD SECURED TO A HOUSING BY SCREWS PROTRUDING THROUGH THE BOTTOM WALL OF THE HOUSING

This is a continuation of application Ser. No. 07/905,485, filed on Jun. 26, 1992, which was abandoned upon the filling hereof and which was a continuation of application Ser. No. 07/542,042, filed Jun. 22, 1990, now abandoned.

BACKGROUND OF THE INVENTION

1. Field of the Invention

The present invention relates to a portable electronic apparatus, and more particularly, to a portable electronic apparatus, such as a laptop personal computer, word processor, etc., having a keyboard at the front portion of a housing thereof.

2. Description of the Related Art

For example, a laptop personal computer generally comprises a housing and a keyboard at the front portion thereof. The housing is formed integrally with a keyboard frame, which presses the peripheral edge portion of the keyboard body, thereby retaining the keyboard in the housing. Keys of the keyboard are arranged at the front portion of the housing so as to project from an opening of the keyboard frame.

With this arrangement, the whole housing must be disassembled in replacing or inspecting the keyboard or in processing a printed board in the housing, thus requiring troublesome operation.

Accordingly, a novel arrangement has started to be used in place of the aforesaid one. In this modern arrangement, the top of the front portion of the housing is entirely opened so that a keyboard frame independent of the housing can be attached to the periphery of the front portion, and the keyboard is disposed inside the frame.

According to this improved arrangement, the printed board in the housing can be exposed by disengaging the keyboard and the keyboard frame from the front portion of the housing. If necessary, therefore, an extension memory, for example, can be easily additionally mounted in the housing without disassembling the whole housing. Further, the keyboard frame can be formed from a low-priced resin material which can be plated. If the keyboard frame is damaged or considerably worn, moreover, the keyboard frame alone can be replaced with a new one.

In the keyboard of the conventional portable electronic apparatus with the aforementioned arrangement, a large number of keys are mounted on the top of a rigid printed board having a circuit pattern, and a shielding plate is attached to the lower surface of the board. The shielding plate is used to prevent switching noises, attributable to key operation, from influencing the printed board in the housing, and its peripheral portion projects outward beyond the periphery of the printed board of the keyboard. The keyboard is attached to the front portion of the housing by superposing the projecting portion of the printed board on screw receiving bosses on the housing front and screwing them together from above. Also, screw receiving bosses integrally protrude downward from the inside of each frame portion of the keyboard frame, and the frame is attached to the housing front by means of screws threadedly passed through the bosses from under the housing.

The keyboard is inevitably large-sized, however, since the shielding plate has the projecting portion on its periphery, in order to allow the keyboard, including the printed board which cannot be provided with any screw receiving portion, to be attached to the housing. Since the screw receiving bosses are arranged on the inside of each frame portion of the keyboard frame, moreover, the individual frame portions have a great width, so that the keyboard frame is large-sized. In the conventional portable electronic apparatus, therefore, the keyboard including its surroundings is bulky, so that the whole housing is large-sized.

SUMMARY OF THE INVENTION

The present invention has been contrived in consideration of these circumstances, and its object is to provide a portable electronic apparatus permitting miniaturization.

In order to achieve the above object, a portable electronic apparatus according to the present invention comprises: a housing having a mounting portion; a keyboard unit removably mounted on the mounting portion, the keyboard unit including a substantially planar keyboard body made of synthetic resin, a large number of keys arranged substantially over the whole top face of the keyboard body, a film member put on the underside of the keyboard body and having a circuit pattern thereon, and a keyboard frame fitted on the peripheral edge portion of the keyboard body, the keyboard frame being fitted in the housing, the keyboard body having a fixing portion protruding from the underside thereof so as to extend through the film member; and means for fixing the fixing portion to the housing.

According to the portable electronic apparatus of the invention constructed in this manner, the keyboard body is fitted inside the keyboard frame for unification. In an aspect of the invention, the keyboard body and the keyboard frame are connected in the following manner. A plurality of engaging hooks, which are formed on the keyboard frame, are caused to engage the underside of the edge portions of the keyboard body by passing the hooks through their corresponding notches in the keyboard body. At the same time, the lower surface of the inner peripheral wall portion of the keyboard frame is caused to abut against the upper surface of the peripheral edge portion of the keyboard body. Thus, the peripheral edge portion of the keyboard body is vertically held between the inner peripheral wall portion of the frame and the engaging hooks from both sides. Then, the keyboard frame is fitted into the housing, so that the keyboard unit, including the keyboard body and the keyboard frame connected to each other, is temporarily assembled to the mounting portion of the housing. The assembled keyboard unit is fixed to the housing as the fixing portion, integrally formed on the keyboard body, is fixed to the housing by means of the screwing means.

Accordingly, the keyboard frame need not be provided with any fixing portion such as screw receiving bosses, so that each frame portion can be reduced in size. Since the keyboard body is made of synthetic resin, moreover, the fixing portion can be formed integrally with the body. Thus, the fixing portion can be arranged without forming any projecting portion which protrudes from the peripheral edge of the keyboard body, so that the keyboard itself can be made small-sized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 15 show a laptop personal computer according to an embodiment of the present invention, in which:

DETAILED DESCRIPTION OF THE PREFERRED EMBODIMENTS

A laptop personal computer according to the present invention will now be described with reference to the accompanying drawings.

Figure 1:
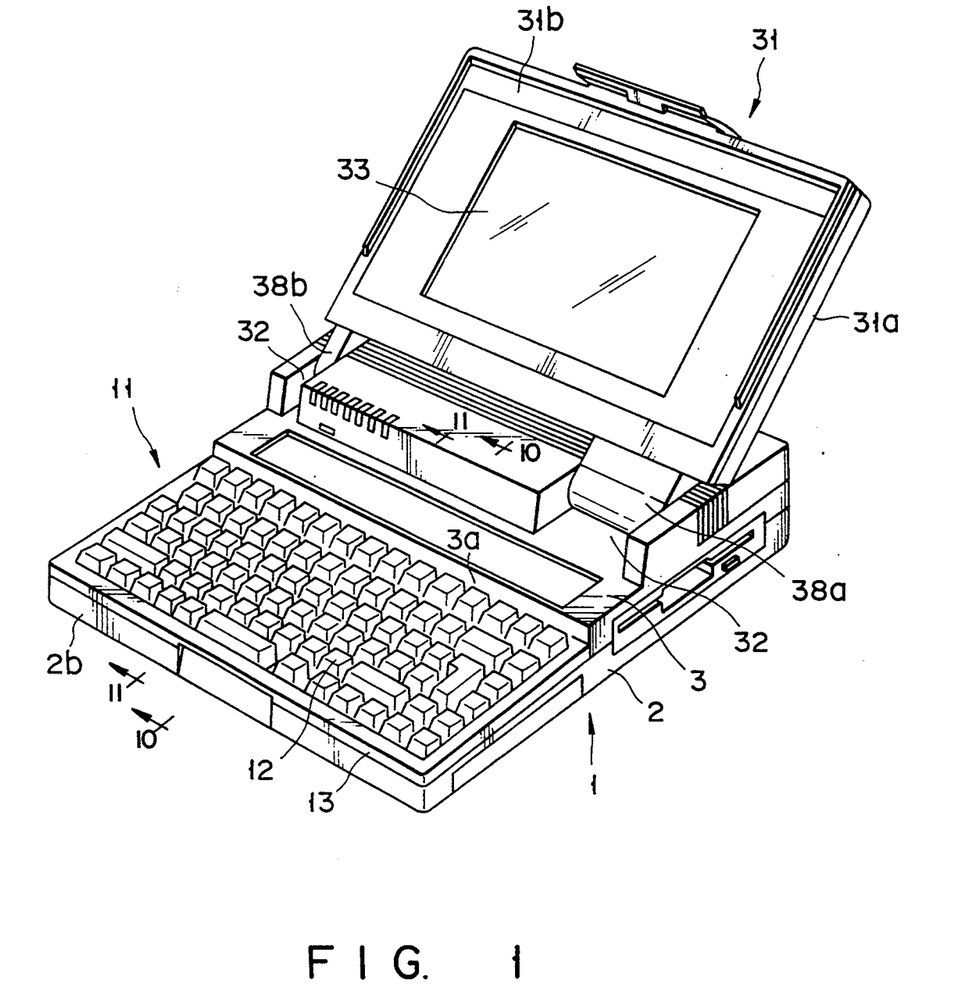
FIG. 1 is a perspective view of the computer.
Figure 2:
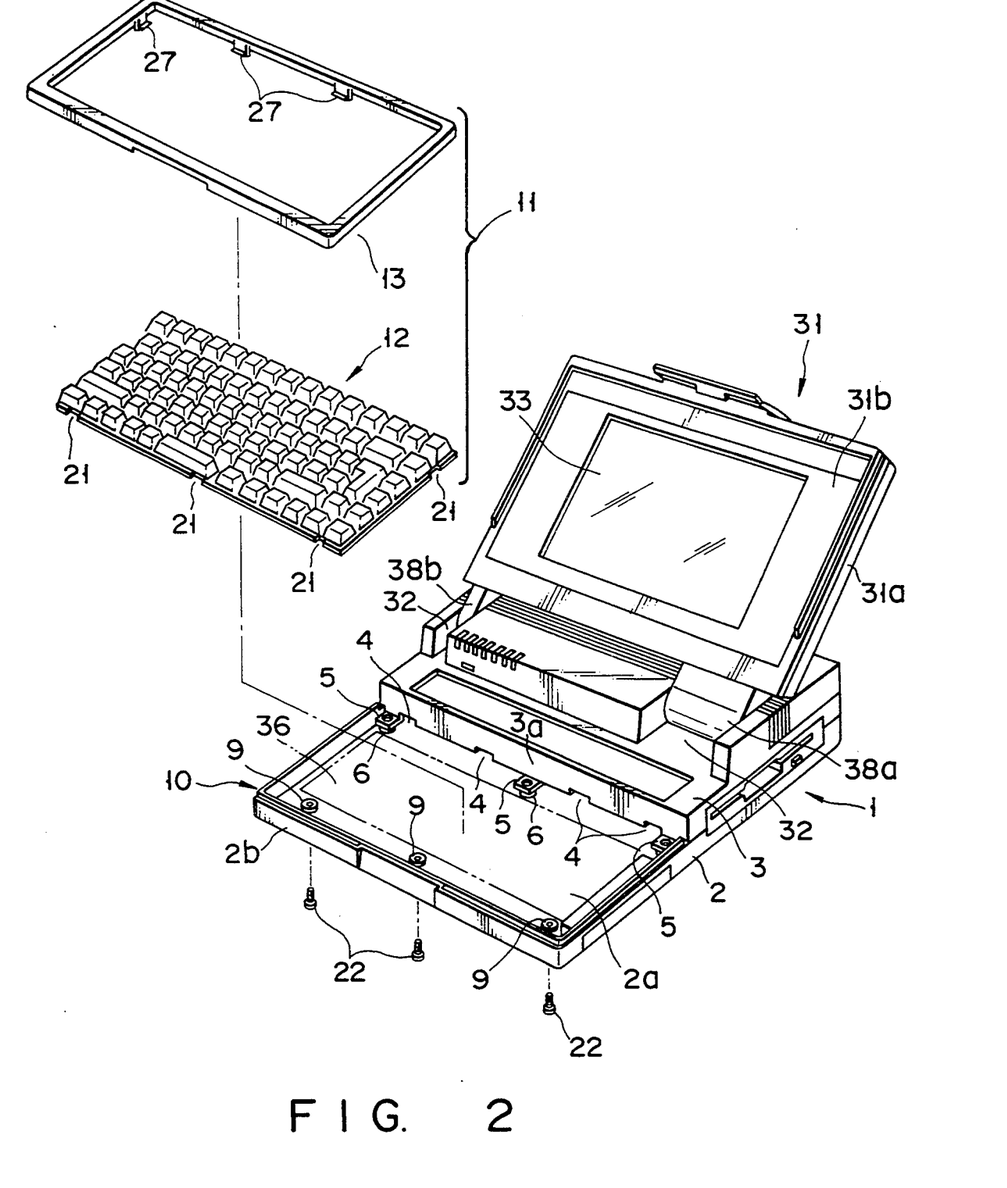
FIG. 2 is an exploded perspective view of the computer.

As shown in FIGS. 1 and 2, the computer comprises a plastic housing 1 having a substantially rectangular plane configuration. The housing 1 includes a base portion 2 having an entirely open top and a cover portion 3 screwed to the base portion 2 so as to cover the rear half thereof. The base portion 2 includes a substantially rectangular bottom wall 2a and a peripheral wall 2b protruding therefrom and extending along the peripheral edge of the bottom wall. The housing 1 contains therein a printed board 36 (mentioned later) mounted with electronic parts, a floppy disk drive unit (not shown), etc.

Figure 10:
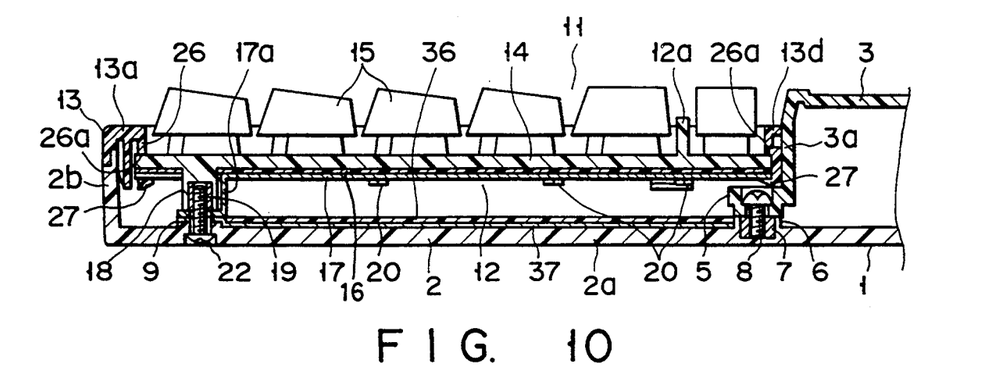
FIG. 10 is a sectional view taken along line 10—10 of FIG. 1.

A front end wall 3a of the cover portion 3 extends substantially perpendicular to the bottom wall 2a of the base portion 2, and engaging portions 4 (see FIGS. 2 and 11) are formed at a plurality of positions of the lower part of the wall 3a. In this embodiment, each engaging portion 4 is formed of a recess cut in the lower edge of the front end wall 3a. Alternatively, however, the engaging portion 4 may be formed of a hole or a forwardly opening recess. The front portion of the peripheral wall 2b of the base portion 2, situated corresponding to the front half of the base portion, constitutes a front peripheral wall of the housing 1. The front peripheral wall and the front end wall 3a define a mounting portion 10 having an entirely open top for receiving a keyboard unit 11 mentioned later. The printed board 36 is disposed on the bottom wall 2a so as to face the opening of the mounting portion 10. As shown in FIG. 10, moreover, a shielding film 37 is interposed between the board 36 and the bottom wall 2a. The film 37, which is connected to a circuit ground of the computer, serves to shield the board 36 from electromagnetic noise from outside the housing 1.

As shown in FIGS. 2 and 10, the front end wall 3a integrally includes a plurality of connecting portions 5 which protrude forward from the lower end of the wall 3a. These connecting portions 5 are put on their corresponding screw receiving projections 6 which protrude from the bottom wall 2a of the base portion 2. A nut 7 is inserted in each projection 6, and each connecting portion 5 is fixed to the base portion 2 by means of a screw 8 screwed into its corresponding nut 7 from above through the connecting portion 5. The connecting portions 5 are used to support a rear frame portion 13d of a keyboard frame 13 (mentioned later) from below. Three projections 9 are integrally formed on the front end portion of the bottom wall 2a of the base portion 2. Each projection 9 has a through hole through which a screw 22 for fixing the keyboard unit 11 is passed.

The keyboard unit 11 is removably attached to the mounting portion 10 of the housing 1 so as to close the top opening thereof. The unit 11 includes a keyboard 12 and the keyboard frame 13 surrounding the peripheral edge portion of the keyboard.

Figure 3:
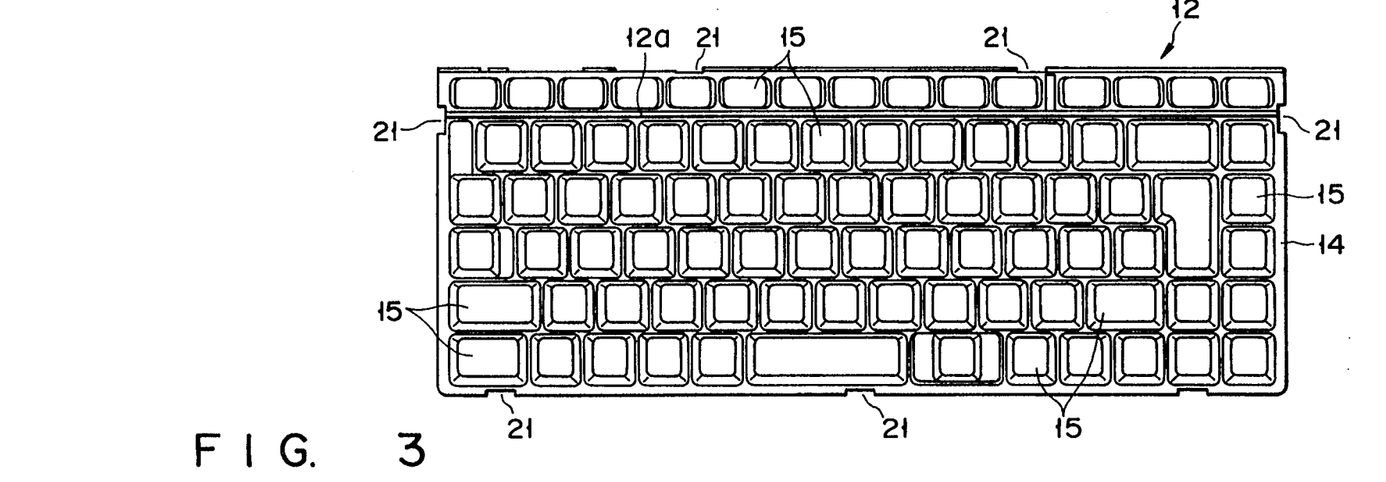
FIG. 3 is a plan view of a keyboard unit.
Figure 4:
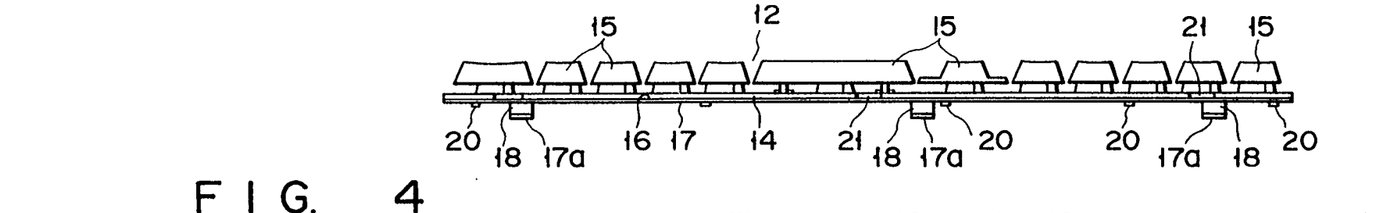
FIG. 4 is a front view of the keyboard unit.
Figure 5:
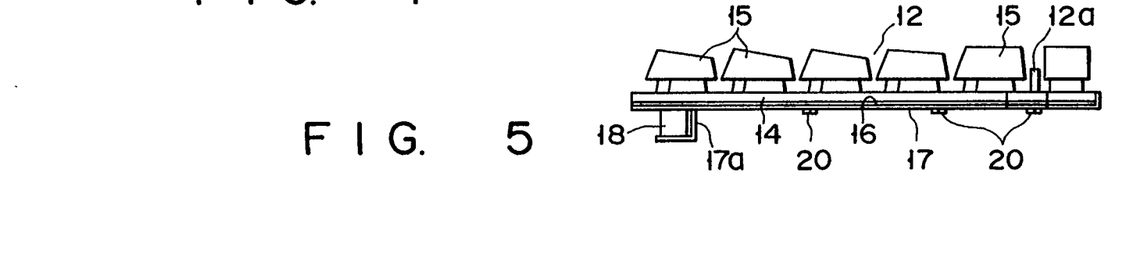
FIG. 5 is a side view of the keyboard unit.

As shown in FIGS. 3 to 5, the keyboard 12 includes a keyboard body 14, a large number of keys 15, a film 16, and a shielding plate 17. The keyboard body 14 is in the form of a flat plastic plate having a rectangular plane configuration. The keys 15 are arranged substantially over the whole top face of the keyboard body 14. A protuberant face bar 12a is integrally formed on the top face of the keyboard body 14 so as to divide standard keys and function keys.

A plurality of screw receiving bosses 18 for use as a fixing portion integrally protrude from the underside of the front portion of the keyboard body 14. These bosses 18 are located within the area of projection of the key group 15, that is, inside the range of arrangement of the keys 15, and face the projections 9 on the bottom wall 2a of the housing 1. Bosses 18 project downward through the film 16 and the shielding plate 17. As shown in FIG. 10, a nut 19 is inserted in each boss 18.

The film 16 is put on the underside of the keyboard body 14 so as to cover the whole area thereof, and is formed having a circuit pattern used to guide switching input by means of key operation. The shielding plate 17 serves to prevent switching noises produced by the key operation from influencing the printed board 36 in the housing 1. The shielding plate 17, which is substantially equal to the keyboard body 14 in size, is fixed to the underside of the body 14 so that the film 16 is sandwiched between the plate 17 and the body 14. The shielding plate 17 and the film 16 are fixed to the keyboard body 14 by means of a plurality of screws 20 for keyboard assembly, which are passed through the two layers to be threadedly engaged with the body 14. Some portions of the shielding plate 17 are cut and bent to form L-shaped bent portions 17a. Each bent portion 17a covers the rear face and bottom face of its corresponding screw receiving boss 18. A plurality of notches 21 are cut in the peripheral edge portion of the rectangular plate structure of the keyboard 12.

As seen from FIG. 10, each screw receiving boss 18 of the keyboard 12 constructed in this manner is threadedly engaged with a screw 22 which is passed through its corresponding screw passage projection 9 and the bottom portion of its corresponding bent portion 17a, from under the bottom wall 2a of the housing 1. The keyboard 12 can be fixed to the mounting portion 10 of the housing 1 by tightening the screws 22.

Figure 11:
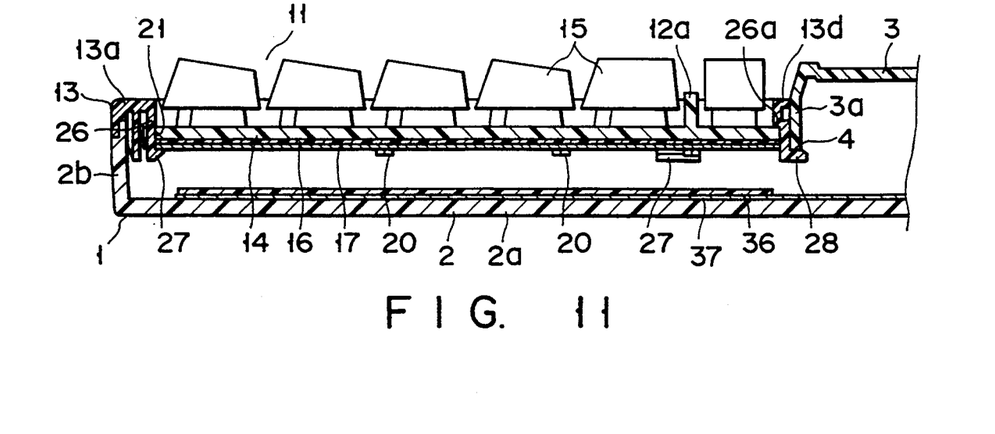
FIG. 11 is a sectional view taken along line 11—11 of FIG. 1.

The keyboard frame 13 is a rectangular frame formed of synthetic resin such as ABS resin, and its details are shown in FIGS. 6 to 9. The frame 13 has a fitting groove 25 which is continuously formed along a front frame portion 13a and two opposite lateral frame portions 13b and 13c thereof. As shown in FIGS. 10 and 11, moreover, a rear frame portion 13d of the keyboard frame 13 abuts against the whole surface of the front end wall 3a of the cover portion 3, and the fitting groove 25 is in engagement with the front peripheral wall of the base portion 2. In this state, the rear frame portion 13d rests on the connecting portions 5.

Further, the keyboard frame 13 is provided with an annular inner peripheral wall 26 which constitutes its inner circumferential surface. The inner peripheral wall 26 is formed having size and shape such that its lower edge 26a engages the upper surface of the peripheral edge portion of the keyboard body 14, just outside the keys 15. A plurality of engaging hooks 27 integrally protrude downward from the inner peripheral wall 26, corresponding to the notches 21. Each hook 27 is designed so as to be passed through its corresponding notch 21 to engage the lower surface of the peripheral edge portion of the keyboard 12. Each engaging hook 27 is at a vertical distance A from the lower edge 26a of the inner peripheral wall 26. The distance A is substantially equivalent to the thickness of the plate structure of the keyboard 12, that is, the thickness of the combination of the keyboard body 14, film 16, and shielding plate 17. The keyboard 12 is fitted inside the keyboard frame 13 for unification so that its peripheral edge portion is held between the engaging hooks 27 and the lower edge 26a of the inner peripheral wall 26.

Figure 6:
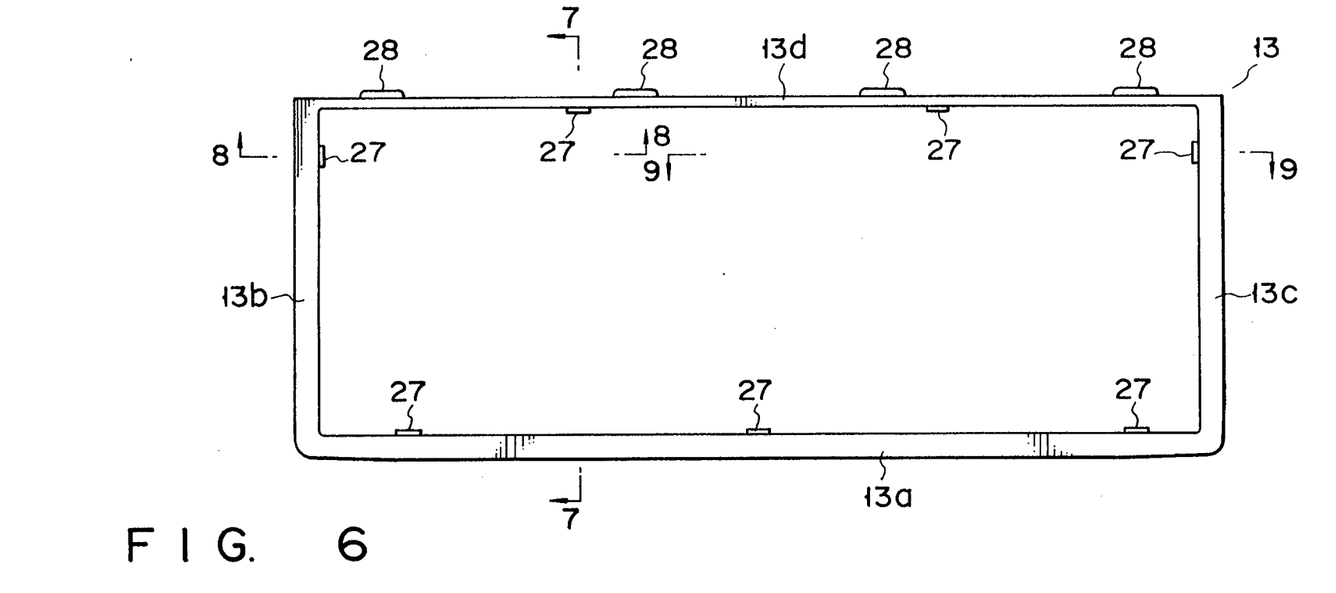
FIG. 6 is a plan view of a keyboard frame.
Figure 7:
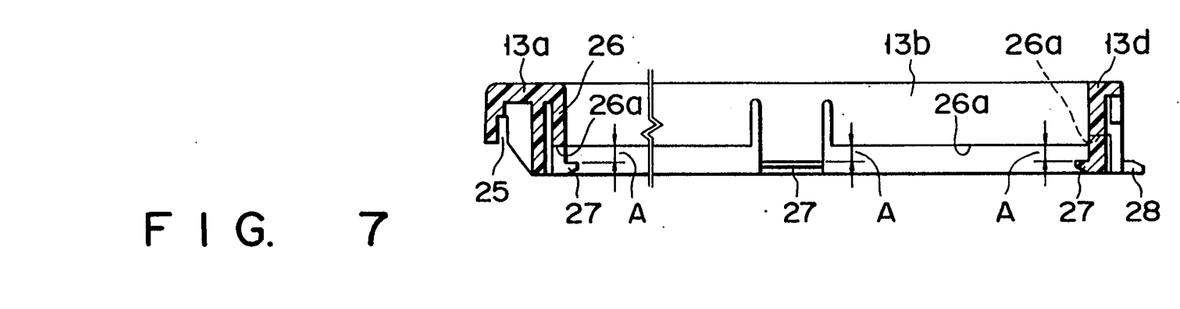
FIG. 7 is a sectional view taken along line 7—7 of FIG. 6.
Figure 8:
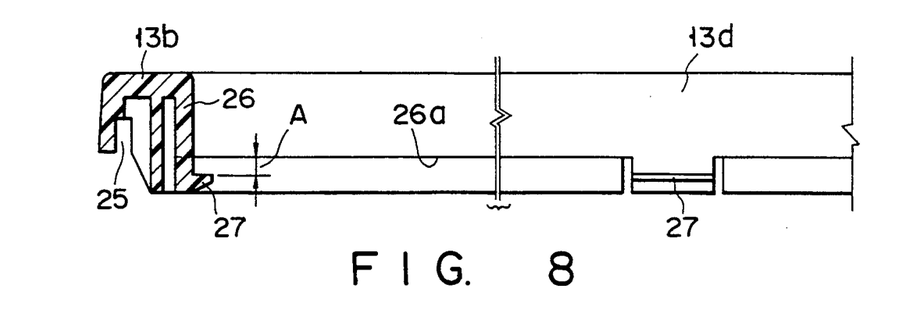
FIG. 8 is a sectional view taken along line 8—8 of FIG. 6.
Figure 9:
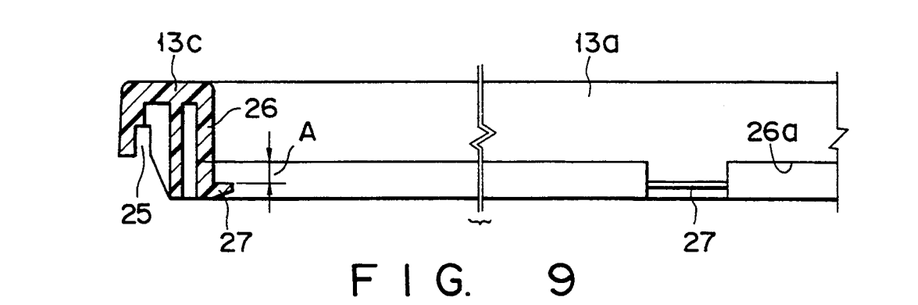
FIG. 9 is a sectional view taken along line 9—9 of FIG. 6.

A plurality of engaging projections 28 protrude rearward from the rear face of the rear frame portion 13d of the keyboard frame 13. These projections 28 are fitted in their corresponding engaging portions 4 of the front end wall 3a. As the engaging projections 28 and the engaging portions 4 thus engage one another, the rear frame portion 13d of the keyboard frame 13 is fixed to the housing 1.

The following is a description of processes for assembling the keyboard unit 11 and mounting the unit 11 on the mounting portion 10 of the housing 1.

First, the keyboard 12 and the keyboard frame 13 are united to form the keyboard unit 11. In this assembly work, the engaging hooks 27 protruding from the inner periphery of the keyboard frame 13 are passed through their corresponding notches 21 of the keyboard 12 in a manner such that the frame 13 is somewhat elastically deformed. By doing this, the keyboard 12 is fitted into the keyboard frame 13.

Thereupon, the engaging hooks 27 passed through the notches 21 engage the lower surface of the peripheral edge portion of the keyboard 12, and at the same time, the lower edge 26a of the inner peripheral wall 26 of the keyboard frame 13 abuts against the upper surface of the peripheral edge portion of the keyboard 12. Thus, the peripheral edge portion of the keyboard 12 is vertically held between the inner peripheral wall 26 and the engaging hooks 27 from both sides, so that the keyboard 12 and the keyboard frame 13 can be connected to each other without using any screws or the like.

Thereafter, the keyboard unit 11 is temporarily assembled to the mounting portion 10 of the housing 1. As shown in FIGS. 10 and 11, the engaging projections 28 of the keyboard frame 13 are first fitted into the engaging portions 4 of the front end wall 3a of the cover portion 3, and the rear frame portion 13d of the frame 13 is caused to abut against the wall 3a. In doing this, the lower edge of the rear frame portion 13d is put on the connecting portions 5 of the front end wall 3a. Subsequently, the upper end portion of the front peripheral wall of the base portion 2 of the housing 1 is fitted in the fitting groove 25, which extends along the lateral frame portions 13b and 13c and the front frame portion 13a of the keyboard frame 13. As a result, the keyboard unit 11 is temporarily assembled to the mounting portion 10 of the housing 1, thereby closing the opening which covers the whole area of the front top face of the housing 1, that is, the opening of the mounting portion.

Finally, the assembled keyboard unit 11 is fixed to the housing 1. More specifically, the screws 22 are passed through their corresponding screw passage projections 9 of the base portion 2 from under the same, and are threadedly engaged with their corresponding screw receiving bosses 18 which integrally protrude from the underside of the keyboard body 14. Thus, the keyboard unit 11 is fixed to the mounting portion 10 of the housing 1 by means of the tightening force of the screws 22. As the unit 11 is fixed to the housing 1 in this manner, as seen from FIG. 10, the shielding plate 17 of the keyboard 12 is connected electrically with the shielding film 37 on the housing side by means of the bent portions 17a. Accordingly, the plate 17 can be connected electrically to the circuit ground on the housing side through the film 37 by only attaching the unit 11 to the housing 1.

When additionally mounting an extension memory or the like on the printed board in the housing 1, the keyboard and its surroundings can be disassembled by inversely following the aforementioned steps of procedure.

Figure 12:
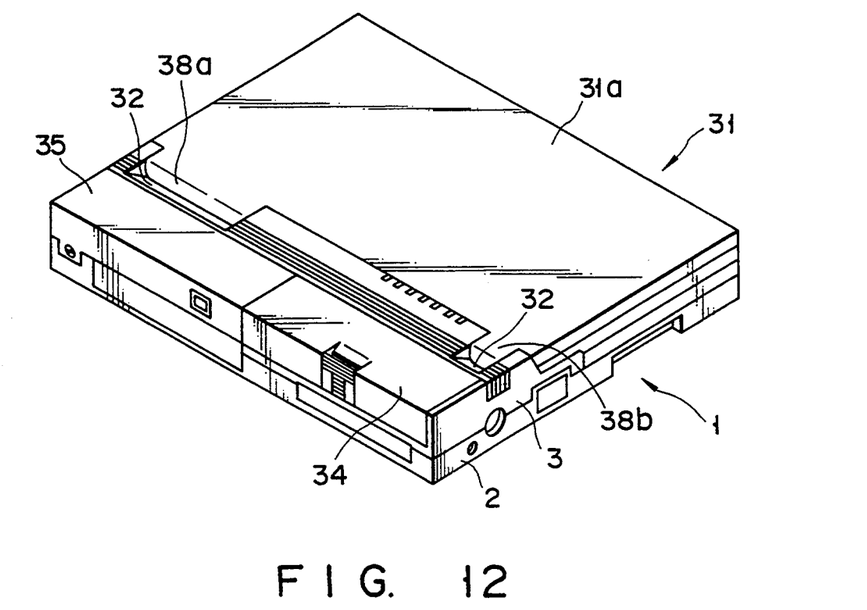
FIG. 12 is a perspective view of the computer, showing a state in which a display housing is closed.

As shown in FIGS. 1, 2 and 12, a display unit 31 is rockably mounted on the cover portion 3 of the housing 1. The unit 31 includes a flat panel display 33, such as a liquid crystal display, an outer cover 31a enclosing the back of the display 33, and an inner cover 31b having a display window. Further, the unit 31 has a pair of legs 38a and 38b, which are inserted in their corresponding recesses 32 in the upper surface of the cover portion 3 of the housing 1, and are rockably supported by means of hinges mentioned later. Thus, the display unit 31 can rock between an open position shown in FIG. 1, where it allows an operator to operate the keyboard 12 while observing the display 33, and a closed position shown in FIG. 12, where it conceals the keyboard 12.

The display unit 31 is designed so that the upper surface of the outer cover 31a is continuous and flush with that of the cover portion 3 of the housing 1 when in the closed position. In FIG. 12, numerals 34 and 35 denote, respectively, a removable battery pack and a removable optional cover which is used to cover an expected arrangement region for optional parts. The respective upper surfaces of the pack 34 and the cover 35 are continuous and flush with that of the cover portion 3.

Figure 13:
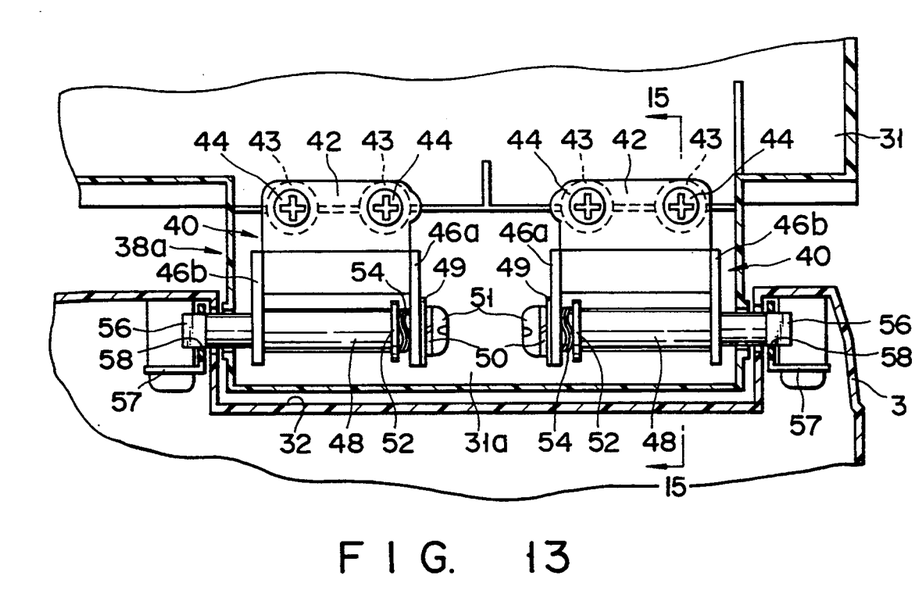
FIG. 13 is a cutaway plan view showing hinges and their surroundings.
Figure 14:
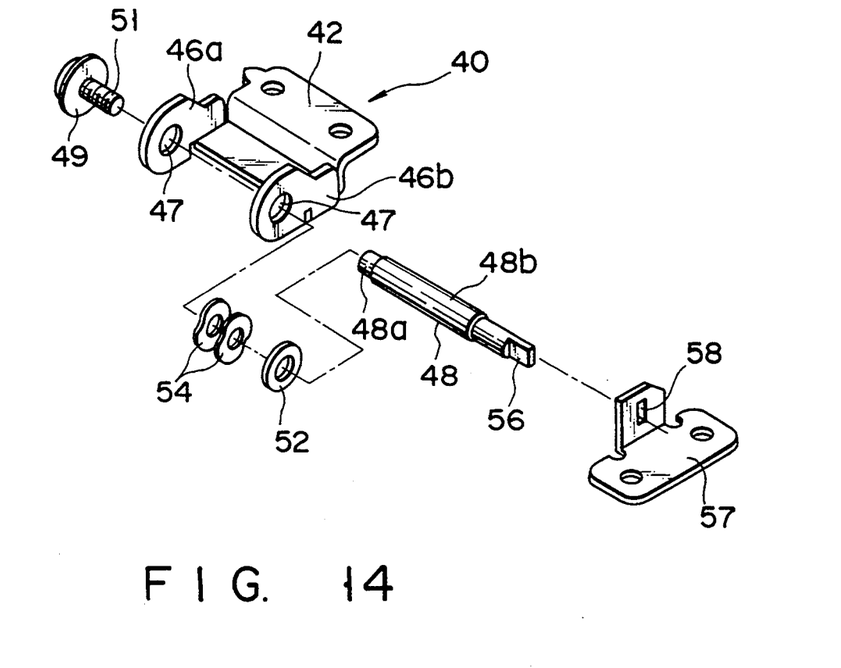
FIG. 14 is an exploded perspective view of one of the hinges.
Figure 15:
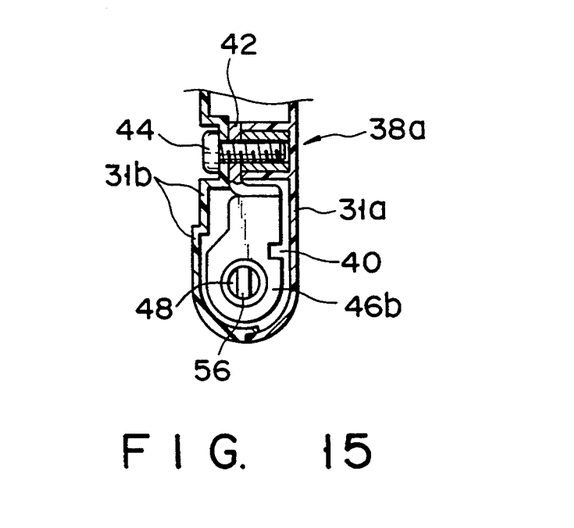
FIG. 15 is a sectional view taken along line 15—15 of FIG. 13.

As shown in FIGS. 13 to 15, a pair of hinges 40 are incorporated in each leg 38a of the display unit 31. These hinges 40 serve not only to support the unit 31 for rocking motion, but also to keep the unit 31 at any desired open angle. Since the two hinges 40 have the same construction, only one of them will be described in detail below.

The hinge 40 is provided with a bracket 42, which is fixed to a pair of bosses 43 on the inside of the outer cover 31a by means of screws 44. The bracket 42 has a pair of bearing walls 46a and 46b facing each other, and a through hole 47 is bored through each bearing wall. A rotating shaft 48 is rotatably passed through the holes 47. A screw 51 is screwed on one end of the shaft 48 with the aid of a plain washer 49 and a spring washer 50, whereby the shaft 48 is prevented from coming off the bracket 42.

The rotating shaft 48 is a stepped shaft having a small-diameter portion 48a and a large-diameter portion 48b. A plain washer 52 with an outer diameter greater than the large-diameter portion is fitted on the small-diameter portion. A stepped portion between the large- and small-diameter portions 48a and 48b is situated close to the bearing wall 46a, and the washer 52 abuts against this stepped portion. Further, wave washers 54 for use as ring-shaped spring members, e.g., two in number, are mounted on the small-diameter portion 48a so as to be situated between the bearing wall 46a and the plain washer 52. The washers 54 are axially compressed between the wall 46a and the washer 52 by means of the clamping force of the screw 51. Thus, a frictional force is produced between the wall 46a and the washer 52, that is, between the bracket 42 and the rotating shaft 48, by the action of the wave washers 54. This frictional force serves to restrain relative rotation of the bracket 42 and the shaft 48.

The other end portion of the rotating shaft 48 projects into the inside space of the cover portion 3, penetrating the wall of the leg 38a and a wall defining the recess 32. A rectangular stopper portion 56 is formed at the projecting end portion of the shaft 48. The stopper portion 56 is nonrotatably fitted in a rectangular hole 58 of a receiving fitment 57, which is fixed to the inside of the cover portion 3.

When the display unit 31 is rocked from its closed position to a desired open position, the bracket 42, fixed on the display unit side, rocks around the outer circumferential surface of the rotating shaft 48. The two wave washers 54 are interposed between the washer 52 on the shaft 48 and the bearing wall 46a of the bracket 42. Accordingly, the washers 54 are pressed against both the wall 46a and the washer 52 to produce the frictional force between them. This frictional force restrains the bracket 42 and the rotating shaft 48 from rocking relatively to each other, so that the display unit 31 can be kept fixed at the desired open position.

According to the personal computer constructed in this manner, the keyboard frame 13 is pressed against the front peripheral edge of the base portion 2, through the engagement between the keyboard body 14 and the engaging hooks 27, as the screws 22 for fixing the keyboard 12 are tightened. At the same time, the rear frame portion 13d of the keyboard frame 13 is attached to the mounting portion 10 so that it is prevented from slipping off upward by the engagement between the engaging projections 28 and the engaging portions 4. Accordingly, the keyboard frame 13 need not be provided with screw receiving bosses or the like for fixing the frame 13 to the housing 1. Thus the frame portions 13a to 13c of the keyboard frame 13 can be reduced in width, so that the whole frame can be miniaturized.

The keyboard 12 is constructed including the plastic keyboard body 14 and the film 16 with the circuit pattern on the underside thereof, instead of using a printed board. In this arrangement, the screw receiving bosses 18 can be integrally formed on the plastic body 14. Accordingly, the shielding plate 17 need not be provided with any fixing portion for fixing the keyboard 12 to the housing 1, and therefore, can be formed having substantially the same size as the keyboard body 14. Thus, the keyboard 12 can be miniaturized.

Since the keyboard and its surroundings can be thus reduced in size, the whole apparatus can be made small-sized.

As the keyboard unit 11 is fixed to the housing 1, moreover, the shielding plate 17 of the keyboard 12 is connected electrically with the shielding film 37 on the housing side by means of the bent portions 17a. Accordingly, the plate 17 can be connected electrically to the circuit ground on the housing side through the film 37 by only attaching the unit 11 to the housing 1. Thus, there is no need of providing any exclusive-use connecting circuit for connecting the shielding plate 17 and the circuit ground, so that the construction and assembly of the apparatus can be simplified.

It is to be understood that the present invention is not limited to the embodiment described above, and that various changes and modifications may be effected therein by one skilled in the art without departing from the scope or spirit of the invention.

For example, the present invention is not limited to the portable electronic apparatus of the type described in connection with the above embodiment, and may be also applied to any other suitable electronic apparatuses, such as those portable electronic apparatuses whose display unit is not collapsible.

What is claimed is:

1. A portable electronic apparatus comprising:
   a housing including a bottom case having a bottom wall, a front portion and a rear portion, and an upper case covering the rear portion of the bottom case;
   a printed circuit board disposed in the front portion of the housing;
   a keyboard unit removably mounted on the housing to cover the front portion of the bottom case, the keyboard unit comprising:
      a substantially planar keyboard body having a top face, an under side and a fixing portion including a plurality of projections protruding from the under side of the keyboard body;
      a plurality of keys disposed on substantially the entire top face of the keyboard body; and
      a rectangular keyboard frame fitted on the peripheral edge of the keyboard body, the keyboard frame being removably fitted to the front portion of the bottom case and being removable from the bottom case independently of the upper case; and
   means for securing the fixing portion to the housing, the securing means including a plurality of screws screwed into the projections through the bottom wall of the bottom case.

2. An apparatus according to claim 1, wherein said projections include bosses, each boss having a tapped hole therein, the bottom wall of the bottom case having a plurality of projections projecting toward the keyboard unit and each facing a corresponding one of the bosses when the keyboard unit mounts on the housing, and the screws penetrating into the projections in a direction from the bottom wall of the bottom case toward the keyboard unit mounted on the housing and screwed into the tapped holes of the corresponding bosses.

3. An apparatus according to claim 1, wherein said keyboard body has a plurality of notches formed in the peripheral edge portion thereof at spaces from one another, and said keyboard frame has an annular inner peripheral wall abutting against the peripheral edge portion of the top face of the keyboard body, and a plurality of engaging hooks protruding from the inner peripheral wall to extend through the notches and engage the underside of the keyboard body to hold the peripheral edge portion of the keyboard body in cooperation with the inner peripheral wall.

4. A portable electronic apparatus comprising:
 a housing including a bottom case having a bottom wall, a front portion and a rear portion, and an upper case covering the rear portion of the bottom case and having a front end portion proximate to the front portion of the bottom case;
 a printed circuit board disposed in the front portion of the bottom case;
 a keyboard unit removably mounted on the housing to cover the front portion of the bottom case, the keyboard unit comprising:
 a substantially planar keyboard body having a top face, an under side, and a plurality of connecting portions protruding from the under side of the keyboard body;
 a plurality of keys disposed on substantially the entire top face of the keyboard body; and
 a rectangular keyboard frame fitted on the peripheral edge of the keyboard body, the keyboard frame being removably fitted to the front portion of the bottom case and having a projection removably engaging the front end portion of the upper case, the keyboard frame being removable from the bottom case independently of the upper case; and
 a plurality of screws removably fixing the keyboard unit to the housing, the screws being screwed into the connecting portions through the bottom wall of the bottom case.

5. An apparatus according to claim 4, wherein said front end portion of the upper cover includes a supporting portion projecting toward the front portion of the bottom case and an engaging portion, and said keyboard frame includes a rear frame portion abutted against the front end portion of the upper case and resting on the supporting portion, the projection protruding from the rear frame portion and engaging the engaging portion.

6. An apparatus according to claim 5, wherein said bottom case further comprises a peripheral wall protruding from the bottom wall and extending along the peripheral edge of the bottom wall, and said keyboard frame includes a front frame portion facing the rear frame portion and a pair of lateral frame portions, the front and lateral frame portions being fitted on the peripheral wall of the bottom case.

7. A portable electronic apparatus comprising:
 a housing including a bottom case having a bottom wall, a front portion and a rear portion, and an upper case covering the rear portion of the bottom case;
 a printed circuit board disposed in the front portion of the bottom case;
 a keyboard unit removably mounted on the housing to cover the front portion of the bottom case, the keyboard unit comprising:
 a substantially planar keyboard body having a top face, an under side and a fixing portion including a plurality of projections protruding from the under side of the keyboard body;
 a film member disposed on the under side of the keyboard body and having a circuit pattern thereon;
 a shielding plate fixed to the under side of the keyboard body, the film member being between the underside of the keyboard body and the shielding plate, the shielding plate shielding the printed circuit board from electromagnetic noise produced by the keyboard unit, the projections protruding through the film member and the shielding plate;
 a plurality of keys disposed on substantially the entire top face of the keyboard body; and
 a rectangular keyboard frame fitted on the peripheral edge of the keyboard body, the keyboard frame being removably fitted to the front portion of the bottom case and being removable from the bottom case independently of the upper case; and
 means for securing the fixing portion to the housing, the securing means including a plurality of screws screwed into the projections through the bottom wall of the bottom case.

8. An apparatus according to claim 7, wherein said housing includes means, disposed on the bottom wall of the bottom case, for shielding the printed circuit board from external noise, the shielding plate including a conducting portion contacting the shielding means to electrically couple the shielding plate to the shielding means when the keyboard unit mounts on the front portion of the housing.

9. An apparatus according to claim 8, wherein said conducting portion is disposed between one of the projections and the shielding means, and one of the screws is screwed into the projection through the shielding means and the conducting portion.

10. A portable computer comprising:
 a housing including a bottom case having a bottom wall, a front portion and a rear portion, and an upper case covering the rear portion of the bottom case;
 a keyboard unit removably mounted on the housing to cover the front portion of the bottom case, the keyboard unit comprising:
 a plate having an upper face, an under face, and a plurality of fixing portions protruding from the under face of the plate;
 a plurality of keys disposed on substantially the entire upper face of the plate; and
 a frame fitted about a peripheral edge of the plate, the frame being removably fitted to the front portion of the bottom case and being removable from the bottom case independently of the upper case; and a plurality of screws removably fixing the keyboard unit to the housing, the screws being screwed into the fixing portions through the bottom wall of the bottom case.

11. A portable computer according to claim 10, wherein each of the fixing portions includes a boss having a tapped hole, the bottom wall of the bottom case includes a plurality of throughholes each corresponding to one of the bosses when the keyboard unit is mounted on the housing, and each of the screws is screwed into one of the tapped holes through its corresponding said through-hole.

12. A portable computer according to claim 10, wherein each of the fixing portions includes a boss having a tapped hole, the bottom wall of the bottom case includes a plurality of projections each protruding toward the keyboard unit and facing one of the bosses when the keyboard unit is mounted on the housing, and each of the screws penetrates through one of the projections in a direction from the bottom wall toward the keyboard unit and is screwed into the tapped hole of a corresponding said boss.

13. A portable computer according to claim 10, wherein the upper case includes a front edge portion, and the frame includes a frame projection removably engaging the front edge portion of the upper case when the keyboard unit is mounted on the housing.

14. A portable computer according to claim 10, wherein the plate includes a film member disposed on the bottom face of the plate and a shielding plate disposed on the film member.

15. A portable electronic apparatus comprising:
a housing including a bottom case having a bottom wall, a front portion and rear portion, and an upper case covering the rear portion of the bottom case;
a printed circuit board disposed in the front portion of the housing;
a keyboard unit removably mounted on the housing to cover the front portion of the bottom case, the keyboard unit including a top face, an under side, a fixing portion having a plurality of projections protruding from the under side, and a plurality of keys disposed on substantially the entire top face; and
means for securing the fixing portion to the housing, the securing means including a plurality of screws screwed into the projections through the bottom wall.

16. An apparatus according to claim 15, wherein the projections include bosses having a tapped hole therein, the bottom wall has a plurality of second projections protruding toward the keyboard unit and facing the corresponding bosses when the keyboard unit is mounted on the housing, and wherein the screws penetrate into the second projections in a direction from the bottom wall and are screwed into the tapped holes.

17. An apparatus according to claim 16, wherein the keyboard unit comprises:
a substantially planner keyboard body having a peripheral edge and the fixing portion; and
a rectangular keyboard frame removably fitted on the peripheral edge and the front portion so as to be removable from the bottom case independently of the upper case.

* * * * *